United States Patent Office 3,304,289
Patented Feb. 14, 1967

3,304,289
MODIFIED POLYAMIDES HAVING IMPROVED
AFFINITY FOR DYES
James B. Ballentine, Chapel Hill, William A. H. Huffman, Durham, and Oscar A. Pickett, Chapel Hill, N.C., assignors to Monsanto Company, a corporation of Delaware
No Drawing. Filed Dec. 21, 1962, Ser. No. 246,313
7 Claims. (Cl. 260—78)

This invention relates to polymeric materials and more particularly to polyamide compositions with improved dyeing properties.

The general class of polymeric substances with which this invention is concerned are synthetic, high molecular weight, polycarbonamides of the general type characterized by the presence of recurring carbonamide groups as an integral part of the polymer chain, wherein such groups are separated by at least two carbon atoms. They are further characterized by a high melting point, pronounced crystallinity, and insolubility in most solvents except mineral acids, formic acid, and the phenols. The polymers are obtained by the self-polymerization of a monoaminomonocarboxylic acid or by reacting substantially equimolecular proportions of a diamine with a dibasic carboxylic acid. The reactions in both instances are generally conducted at elevated temperatures. When a product capable of being formed into fibers is desired, heating of the reactants is continued until the polyamide has an inherent viscosity of at least 0.4, the inherent viscosity values being determined according to the formula $$\frac{\text{Log}_e \eta_r}{C}$$

in which $\eta_r$ is the relative viscosity of a dilute solution of polymer in m-cresol and C is the concentration in grams of polymer per 100 cc. of solution. The polymers thus obtained have high melting points and can be cold drawn to form strong, highly oriented fibers. Fibers can be produced from these polymers, among other methods, by melt spinning, i.e., by extruding the molten polymer through small orifices. This is followed by a cold drawing operation, that is, stretching the resultant filaments at a temperature below their melting point until they show molecular orientation.

At the temperatures required to spin such polyamides in the molten state (generally 10° to 50° C. above their melting points), they tend to undergo further polymerization. This further polymerization makes it difficult to prepare uniform filaments from the polymer as the filaments first extruded are of a lower molecular weight than those extruded near the end of the spinning operation. In order to overcome this difficulty, it has been a common practice to use a small excess (generally 0.1 to 5 molar percent) of a mono-functional amide-forming compound such as acetic acid in the polyamide forming reaction mixture. Another method commonly employed is to use a small excess of either the diamine or dicarboylic acid when preparing the polyamide. Both procedures give viscosity stabilized polyamides.

Although conventional polyamides of the above-described type possess outstanding properties of great commercial value, their affinity for dyestuffs is generally deficient. Consequently, much effort has been expended in attempts to improve this property with the following approaches receiving the most attention: (1) attempts to provide the polymer with active dye sites by employing as viscosity stabilizers compounds which will provide basic end groups, and (2) copolymerization with monomers having in their molecular structure basic atoms with a bonding affinity for acid dyes. Neither of these methods has proved satisfactory. The first, because the amount of basicity which can be introduced without substantial sacrifice in molecular weight is extremely limited. The second, because such copolymers generally have low melting points and are of a low order of crystallinity relative to the homopolymer. This results from the fact that dissymmetrical units in the polymer chain disrupt the elements in the chain so that hydrogen bonding is reduced.

Accordingly, an object of the present invention is to provide a new class of polyamides and a process for preparing same. A further object is to provide polyamides having an excellent receptivity for acid dyestuffs coupled with good thermostability and spinning performance. A further object is to provide a new method of introducing basicity into polyamides in an amount sufficient to give good acid dye receptivity without deleterious effect on other properties of the polyamide. A still further object of this invention is to provide polyamide fibers, which dye readily with acid dyes, yet retain the high strength and other excellent properties of fibers made from the homopolymer. Other objects of the invention will be apparent from the description given hereinafter.

These objects are accomplished by heating to reaction temperature a monoaminomonocarboxylic acid or substantially equimolecular proportions of a diamine and dicarboxylic acid in the presence of a viscosity stabilizer having basic nitrogen atoms in its molecular structure together with a polyfunctional chain branching agent.

Amino acids which can be self-polymerized to yield these polymers according to the general procedures set out above may be represented by the general formula R—NH—R'—COOH in which R is a univalent organic radical or hydrogen and R' is a divalent hydrocarbon radical containing at least five carbon atoms. Illustrative examples are 6-aminocaproic acid, 7-aminoheptanoic acid, 9-aminononanoic acid, 11-aminoundecanoic acid and 17-aminoheptadecanoic acid.

Similarly, diamines which are readily condensed with equimolecular proportions of an appropriate dicarboxylic acid to yield polyamides of the nature here under consideration may be represented by the general formula $H_2N$—R—$NH_2$ where R is a divalent hydrocarbon radical containing 2 or more carbon atoms, and preferably from 2 to 10. Among the many suitable compounds are ethylenediamine, propylenediamine, tetramethylenediamine, pentamethylenediamine, hexamethylenediamine, octamethylenediamine, decamethylenediamine, m-xylylene diamine, p-xylylene diamine, bis-aminoethyl benzene, benzidine, 1,4-diamino cyclohexane, piperazine and 2,5-dimethyl piperazine.

Dicarboxylic acids for reacting with the mentioned diamines may be represented by the general formula HOOCRCOOH in which R is a divalent hydrocarbon radical having a chain length of at least two carbon atoms. These materials are illustrated by sebacic acid, octadecanedioic acid, adipic acid, suberic acid, azelaic acid, undecanedioic acid, pimelic acid, brassylic acid, tetradecanedioic acid, phenylene diacetic acid, terephathalic acid and isophthalic acid with adipic acid being especially suitable.

In place of the above-noted amino acids, and the combination reaction media comprising dicarboxylic acids and diamines, the amide-forming derivatives thereof may similarly by employed to form desirable polymers. Amide-forming derivatives of the amino acids include the ester, amide, lactam, acid halide, N-formyl derivative, carbamate, and, in the presence of water, the nitrile. Amide-forming derivatives of the diamines includes the carbamate and N-formyl derivative. Amide-forming derivatives of the dibasic carboxylic acids comprise the mono- and di-ester, the anhydride, the mono- and di-amide, and the acid halides.

Suitable viscosity stabilizer or chain terminating agents, the terms being synonymous for purposes of this invention, may be selected from a large number of compounds. Among the amide-forming basic nitrogen containing chain terminators are diamines which contain one or more amide-forming amino groups. Examples of specific compounds of the former type include 1-(6-aminohexyl) pyrrolidine, γ,γ-diethylaminopropoxypropyl amine, 3-bis(2-hydroxyethyl)aminopropyl amine. N-dimethylaminopropyl amine, and N-diethylaminopropyl amine. Examples of the latter type, i.e. having more than one amide-forming functional group, may be illustrated by hexamethylene diamine, decamethylene diamine, N,N'-bis(γ-aminopropyl) piperazine, 3-methyl hexamethylene diamine, N-methylimino dipropyl amine and 1,4-bis(γ-aminopropoxy) benzene. The amines may be cycloaliphatic, aromatic, or aliphatic-aromatic, and may contain either straight or branched chains. Dicarboxylic acids which contain one or more non-amide forming basic nitrogen atoms in their structure are also suitable. Illustrative examples are piperazine diacetic acid, N-methyliminodiacetic acid and N-methyliminodipropionic acid. Amino acids having tertiary amino groups have also been found applicable. Suitable examples are piperidyl acetic acid, nicotinic acid, and isonicotinic acid.

The quantity of chain terminator employed in preparing the modified polymers of this invention may vary from about 0.5 mol percent to about 2.5 mol percent based on the monomer or monomers being polymerized, with from 0.5 to 2.0 mol percent being preferred. However, when preparing polymers for films, coatings, adhesives, etc. higher concentrations are permissible.

The chain branching agents which may be employed in combination with the above-described chain terminating agents include practically any amide-forming reactant having a functionality greater than two. Among the many applicable polyfunctional acids are trimesic acid, ethylene diamine tetraacetic acid, nitrilo-tris-propionic acid, citric acid, tricarballylic acid, mellitic acid, hexahydromellitic acid and pyromellitic acid. Suitable polyfunctional amines include amines with three or more amide-forming amino groups either derived from aliphatic, cycloaliphatic, aromatic or mixed sources. Among others, these include tetra (aminopropoxymethyl) methane, tris-aminopropyl amine and melamine. Additionally, the polyfunctional amines or acids may be used in the form of their amide-forming derivatives. Thus, the acids can be used in the form of their amides, salts or esters, while the polyfunctional amines can be used in the form of their salts or amides. Salts of the above-defined acids with ammonia, alkali metals, and alkaline-earth metals can be employed in the process of the invention as can the anhydrides of said acids.

In utilizing the polyfunctional chain branching agents of the invention, particularly with the objective of producing polymers from which fibers may be formed, it is found that the quantity employed may vary within relatively wide limits. When the polymers formed are intended for use in producing fibers having the dyeing characteristics that the invention seeks to provide, it is found that as little as 0.05 mol percent and up to about 0.6 mol percent based upon mols of the monomer to be polymerized is quite satisfactory. Preferably, however, a quantity within the range of 0.1 to 0.5 mol percent is employed. Where the objective of the process is to provide polymers for purposes other than fiber forming, for example, films, and the like, 1.0 mol percent is found to provide excellent results although a greater quantity may be employed if desired.

The following examples illustrate specific embodiments of the invention. All proportions are by weight unless otherwise stated.

Example I

In this example, a conventional polyamide was prepared from a hexamethylenediammonium adipate monomer using acetic acid as the viscosity stabilizer. The purpose of this preparation was to provide a standard for comparison with the modified polyamides of the present invention.

A mixture of 223 grams of hexamethylenediammonium adipate, 0.45 mol percent of acetic acid as a viscosity stabilizer and 90 ml. of water were charged to a stainless steel autoclave. The charge and system were purged of air by alternately evacuating and filling the autoclave with nitrogen several times. The pressure and temperature were then raised until values of 250 p.s.i.g. and 220° C. respectively were reached after which water was removed as condensate until the polymer melt temperature was about 240° C. At this point, the autoclave pressure was reduced at the rate of 5 p.s.i.g. each minute until atmospheric pressure was attained. The polymerization was completed by heating at atmospheric pressure for 30 minutes. The final reaction temperature was about 280° C.

The polymer was melt spun from the autoclave as undrawn single filament fibers. The melt spun fibers were then machine drawn to a draw ratio of 4.6.

Example II

An autoclave of the type commonly used in nylon manufacture was charged with 223 g. (0.85 mol) of hexamethylenediammonium adipate, 2.17 g. (0.1275 mol) of 1-(6-aminohexyl) pyrrolidine, 2.373 g. (0.0043 mol) of the salt made from one molar portion of trimesic acid and three molar portions of hexamethylene diamine, and 100 ml. of water. The charge was polymerized under essentially the same conditions as the polymerization described in Example I. The polymer obtained was white in color, highly crystalline and afforded excellent performance in spinning and drawing operations. The fibers formed from the polymer were cold drawn to a 4.1 ratio. They compared favorably with respect to tenacity with those of Example I, measuring 3.7 grams per denier at 17 percent elongation as compared with 3.8 grams per denier at 32 percent elongation for the fibers of Example I.

Example III

An autoclave charge consisting of 223 g. (0.85 mol) of hexamethylenediammonium adipate, 2.397 g. (0.1275 mol) of γ(γ'-diethylaminopropoxy) propylamine, and 0.835 g. (0.0013 mol) of the salt made from two molar proportions of adipic acid and one molar proportion of tetra-(aminopropoxymethyl) methane dissolved in 100 ml. of water was polymerized under the conditions described in Example I.

Again, the polymer was white in color, crystalline in structure, and afforded excellent performance in spinning and drawing operations.

Example IV

To an autoclave were charged 223 g. (0.85 mol) of hexamethylenediammonium adipate, 1.98 g. (0.017 mol) of hexamethylenediamine, and 0.950 g. (0.0017 mol) of the salt made from two molar portions of trimesic acid and three molar portions of hexamethylenediamine, and 100 mls. of water. The charge was polymerized under essentially the same conditions as the polymerization described in Example I. The polymer obtained was white in color, highly crystalline and afforded excellent performance in spinning and drawing operations.

Example V

Hexamethylenediammonium adipate, 225 grams (0.86 mol) was placed in a stainless steel bomb together with 90 mls. of distilled water. To this mixture was added 1.0 g. (0.0026 mol) hexamethylenediammonium trimesate and 0.72 g. (0.005 mol) N-aminopropyl morpholine.

The contents of the bomb were stirred and attached to the autoclave head. After purging the system with nitrogen by using alternate cycles of vacuum and pressure, the autoclave was heated until the internal pressure reached 250 p.s.i.g.

Steam was allowed to escape through the off-steam line so that the pressure would be maintained at 250 p.s.i.g. These conditions were held until the autoclave temperature rose to 243° C. At this point, the pressure was reduced at a rate of five pounds per minute until atmospheric conditions were attained. The contents of the autoclave were then held for thirty minutes at atmospheric pressure. This completed the polymerization and the autoclave was sealed after charging with nitrogen to 250 p.s.i.g. and thereafter cooled to room temperature. The polymer obtained was normal in color and highly crystalline.

*Example VI*

The polymerization procedure in this preparation was identical with that described in Example V. However, some changes in quantities of materials were made as indicated below:

Hexamethylenediammonium trimesate  
    4.0 g. (0.01 mol)  
N-aminopropyl morpholine _____ 2.16 g. (0.015 mol)

Again the polymer obtained was white and highly crystalline.

As has been noted hereinabove, an important objective of this invention was to provide polyamides having an enhanced affinity for acid type dyestuffs over that possessed by conventional polyamides. The accomplishment of this objective was established by running comparative dye tests in accordance with the following procedure:

Samples of previously weighed fibers were placed in a dyebath having a liquor to fiber ratio of 40/1. The dyebath contained an amount of the dye Scarlet 4 RA Conc. (C. I. 16255) in excess of that which could be expected to be absorbed by the fiber sample, i.e. 10 percent based on the weight of the fiber. The bath temperature was controlled at 100° C., and the pH was maintained in the range of from 3 to 5 by the addition of lactic acid to the dyebath. The dyeing time allowed was 4 hours, since this was the time found to be required for dyestuff absorption into the fiber to come to equilibrium. Following the dyeing operation, the amount of dyestuff exhausted from the bath was determined by taking optical density measurements, using a Cary Spectrophotometer. From these data the percent of dye absorbed by the polyamide was calculated by subtracting the amount analyzed from the original quantity. The following results were obtained for the examples described above.

| Example | Initial Dye Conc. Percent on Weight of Fiber | Percent Dye Absorbed on Weight of Fiber |
|---|---|---|
| I (control) | 10 | 1.2 |
| II | 10 | 4.2 |
| III | 10 | 2.6 |
| IV | 10 | 4.3 |
| V | 10 | 4.3 |
| VI | 10 | 4.3 |

The above test results clearly show the superiority of the modified polyamides of this invention over conventional polyamides in their affinity for acid dyestuffs. That is, the modified polyamides are shown to be capable of absorbing between 2 and 4 times as much acid dyestuff as conventional polyamides.

In order to demonstrate that the outstanding dye characteristics of our novel polymers are attained without any undue sacrifice of molecular weight, comparative molecular weight determinations were taken on the above-noted examples. That is, relative viscosity measurements were taken, the results of which bear a direct relationship to molecular weight. Relative viscosity is determined in a conventional Ostwald viscometer at 25° C. A solution of the polyamide is prepared in 90 percent formic acid having a concentration of 11 grams per 100 cc. solvent. The time required for a given volume of this solution to pass through the viscometer divided by the time required to pass an equal volume of solvent through the viscometer is taken as the relative viscosity of the polymer. The following results were obtained.

| Example: | Relative viscosity of polymer |
|---|---|
| I (control) | 35.00 |
| II | 31.76 |
| III | 29.20 |
| IV | 29.16 |
| V | 43.60 |
| VI | 35.70 |

As can be seen from the above data the relative viscosity values of the examples corresponding to polymers of this invention are in the same general range as that of the control (a conventional fiber forming polyamide).

In forming the polymers of this invention from the initial reactants, elevated temperatures are generally employed. However, normal temperatures or even lower may be used when utilizing, for example, the well-known interfacial polymerization technique.

Modifying agents, such as delusterants, antioxidants and the like may be employed with our polymers, and the polyamides of this invention can be used in combination with other polyamides. Although the novel and improved polyamides in this invention are of primary interest in the production of yarns and fabrics, they may also be used in other applications to which synthetic linear polyamides have been put, e.g., bristles, coatings, adhesives, molding compositions, films and other uses to which polyamides are put. They are, of course, of particular value in end uses where an enhanced receptivity for dyestuffs is of importance.

As many different embodiments of this invention may be made without departing from the spirit and scope thereof, it is to be understood that we do not limit ourselves to the specific embodiments set forth herein. Accordingly, modifications and variations of process details, the substitution of components which perform similarly and like deviations derivable from the teachings contained herein or which will be obvious to those skilled in the art are not excluded from the contemplated and intended scope of the invention.

What is claimed is:

1. A fiber-forming synthetic linear polycarbonamide of a composition selected from the group consisting of
   (a) a polymermizable monoaminocarboxylic acid having the formula

R—NH—R'—COOH wherein R is a radical selected from the group consisting of a monovalent hydrocarbon radical and hydrogen and R' is a divalent radical having at least five carbon atoms and
   (b) substantially equimolar proportions of a dicarboxylic acid having the formula

HOOC—R''—COOH and a diamine having the formula $NH_2$—R'''—$NH_2$ wherein R'' and R''' are divalent radicals each having at least two carbon atoms, from 0.5 to 2.5 mol percent of an amide-forming basic nitrogen chain terminator having not greater than two amide-forming groups and from 0.05 to 1.0 mol percent of a chain branching agent selected from the group consisting of a polycarboxylic acid having at least three carboxyl groups, amide forming derivatives thereof and a tetra[aminopropoxymethyl]methane.

2. The polyamide of claim 1 wherein said chain terminator is a diamine.

3. The polycarbonamide of claim 1 wherein said chain terminating agent is piperidylacetic acid and said chain branching agent is tetra(aminopropoxymethyl)methane.

4. The polycarbonamide as defined in claim 1 wherein said chain terminating agent is hexamethylenediamine and said chain branching agent is trimesic acid.

5. The polycarbonamide as defined in claim 1 wherein said chain terminator is 1-(6-aminohexyl)pyrrolidine and said chain branching agent is the salt of trimesic acid and hexamethylenediamine.

6. The polycarbonamide as defined in claim 1 wherein said chain terminator is γ(γ'-diethylamonipropoxy)propylamine and said chain branching agent is the salt obtained from the reaction of two mols of adipic acid with one mol of tetra-(aminopropoxymethyl)methane.

7. The polycarbonamide as defined in claim 1 wherein said chain terminator is N-aminopropyl morpholine, and said chain branching agent is hexamethylenediammonium trimesate.

References Cited by the Examiner

UNITED STATES PATENTS

| | | | |
|---|---|---|---|
| 2,130,948 | 9/1938 | Carothers | 260—78 |
| 2,174,527 | 10/1939 | Peterson | 260—78 |
| 2,359,833 | 10/1944 | Faris | 260—78 |
| 2,512,632 | 6/1950 | Fisher et al. | 260—78 |
| 2,617,786 | 11/1952 | Mowry | 260—78 |
| 2,671,071 | 3/1954 | Laakso et al. | 260—78 |
| 2,907,754 | 10/1959 | Howlett et al. | 260—78 |
| 3,184,436 | 5/1965 | Magat | 260—78 |

FOREIGN PATENTS

| | | |
|---|---|---|
| 633,224 | 12/1961 | Canada. |
| 825,089 | 12/1959 | Great Britain. |

OTHER REFERENCES

Szmant: Organic Chemistry, 1957, Prentice-Hall, Inc., Englewood Cliffs, N.J., page 466, QD 251, S95.

WILLIAM H. SHORT, *Primary Examiner.*

H. D. ANDERSON, *Assistant Examiner.*